Figure 1:
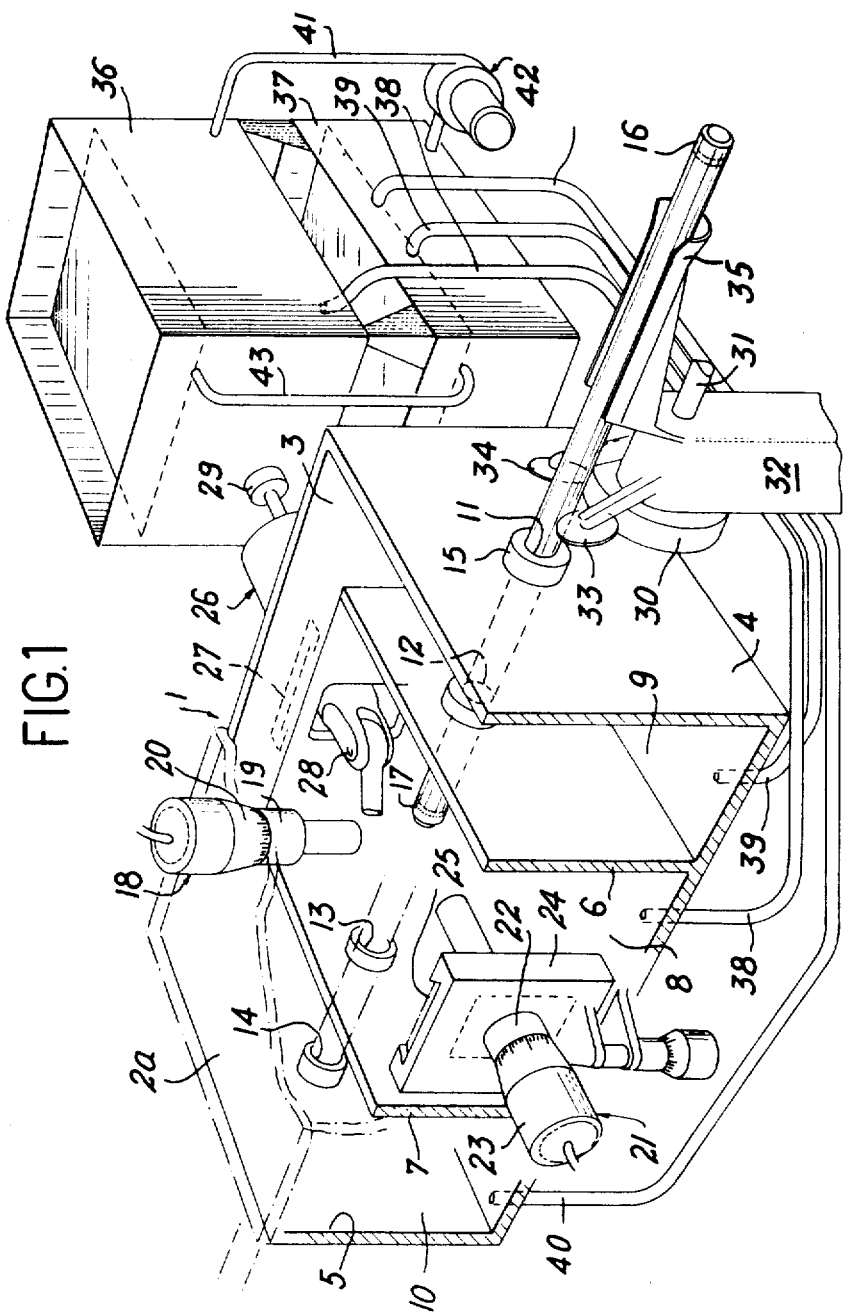

United States Patent
Boulanger et al.

[15] 3,678,735
[45] July 25, 1972

[54] INSTALLATION FOR ULTRASONIC TESTING

[72] Inventors: Gilbert Boulanger; Alain Samoel, both of Les Lavandes, rue Leon Mure, 4 Manosque, France

[73] Assignee: Commissariat A L'Energie Atomique, Paris, France

[22] Filed: April 26, 1971

[21] Appl. No.: 137,182

[30] Foreign Application Priority Data
April 30, 1970 France.................................7016042

[52] U.S. Cl. ............................................................73/67.7
[51] Int. Cl. ....................................................G01n 29/00
[58] Field of Search ......................73/67.5, 67.6, 67.7, 67.8, 73/67.9

[56] References Cited
UNITED STATES PATENTS
3,224,254  12/1965  Loving................................73/67.8 X
3,242,722  3/1966  Barr et al..............................73/67.8

Primary Examiner—James J. Gill
Assistant Examiner—Arthur E. Korkosz
Attorney—Cameron, Kerkam & Sutton

[57] ABSTRACT

The installation comprises an unsealed measuring vessel in which the level of water employed for ultrasonic energy transmission is maintained constant by a supply system which prevents air bubbles and turbulence within the vessel. The supply system comprises a constant-level supply tank and a leakage-retention tank connected to each other by means of two pipes respectively for overflow and for continuous discharge through a pump. A mechanism is provided for displacing elements to be tested within the vessel.

8 Claims, 5 Drawing Figures

INSTALLATION FOR ULTRASONIC TESTING

This invention relates to an installation for ultrasonic testing of metallic elements and especially elements of elongated cylindrical shape, especially for the purpose of detecting transverse and longitudinal flaws which are present in the metal and, in the case of tubular elements, of taking simultaneously a measurement of thickness.

The invention applies more especially although not exclusively to automatic and continuous testing of metallic cans of nuclear reactor fuel elements and even more particularly to fuel pins for fast-neutron reactors in which said cans have a very small diameter compared with their length.

A number of different methods of ultrasonic testing are already known. One method in particular consists in employing either one or a number of ultrasonic transducers of the emitter-receiver piezoelectric quartz type which may or may not be focused and move past within the beams emitted by the transducers which are disposed in such a manner that their acoustic axes are displaced by a certain quantity with respect to the axis of said can so that the ultrasonic waves fall on this latter at a given angle of incidence. The presence of a flaw in the metal of the can then produces a partial reflection of the ultrasonic waves, thereby giving rise on return to the corresponding transducer to an "echo" which is analyzed especially by comparison with a standard echo obtained by pre-calibration of the apparatus, thus permitting both location and determination of the characteristics of said flaw. This method is preferably carried out by making use of three transducers, the first two being intended to permit detection of transverse and longitudinal flaws respectively whilst the third is intended to test the thickness of the tubular can which is displaced in continuous motion in the axial direction in conjunction with a movement or rotation about said axis in order to permit complete scanning of the can surface. In order that suitable transmission of the ultrasonic energy supplied by the transducers should additionally be ensured and especially in order to increase the percentage of energy which is refracted relative to the energy which is reflected by the tube surface, said percentage being proportional to the ratio of the velocities of sound in the corresponding media, the transducers and the can which is undergoing testing are immersed in a homogeneous liquid medium usually consisting of water. However, if no special precautions are taken, parasitic effects which impair the accuracy of measurements to a considerable degree must inevitably be expected: in the first place, it is in fact necessary to take into account the bubbles produced in the water contained in a vessel which supports the transducers and through which the can under inspection is displaced, said bubbles being liable to produce ultrasonic reflections which are analyzed as defects by the transducers. In the second place, if the water of the measuring vessel is the cause of turbulences, these latter produce a pressure wave on the faces of the transducers and the wave is converted to a return echo which cannot be distinguished from the real echos arising from flaws in the can which is being inspected.

In conventional solutions, the presence of bubbles in the water of the tank or vessel as well as the appearance of turbulences are practically inevitable when said vessel through which the can passes is continuously connected by a supply pump to a reservoir for maintaining the water level constant and compensating for leakage which occurs progressively as the successive cans pass through the vessel, especially during the time which elapses between the discharge of a given can and the admission of the following can. The leakage referred-to can be reduced by means of valves which close off the transfer openings during the period of time which elapses between the discharge of one can and the admission of the following can. In order to overcome disadvantages of this type, steps have already been taken to construct leak-tight vessels provided with seals for the transfer of the can through the vessel walls. However, these solutions are not practical and call for complicated equipment. In particular, in the case of vessels of the sealed type, the tubes must necessarily be joined mechanically to each other in order to prevent any leakage of water.

This invention is directed to an installation for ultrasonic testing comprising an unsealed vessel in which the water level for ensuring transmission of ultrasonic energy is maintained substantially constant by virtue of a supply device which is so arranged as to prevent the presence of air bubbles and of all turbulences within the vessel.

To this end, said installation is characterized in that it comprises a parallelepipedal measuring vessel divided into three adjacent compartments by two partition-walls which are parallel to two side-walls of the vessel, said two partition-walls and said two side-walls being pierced by transfer openings located in oppositely-facing relation and having a diameter which is slightly larger than that of the cans to be tested, a mechanism for displacing the cans through the compartments of the vessel, measuring transducers carried by separate faces of the vessel in the central compartment and a unit for supplying water to the vessel comprising a constant-level supply tank connected by a first pipe to the bottom of the central compartment and a retention tank connected by two separate pipes to the bases of the two other compartments, the two tanks being additionally connected to each other by means of two separate pipes of which one pipe constitutes an overflow for limiting the level to a constant value within the supply tank and the other pipe is fitted with a pump which continuously discharges from the retention tank to the supply tank.

As an advantageous feature, the central compartment of the measuring vessel has a small volume compared with the volume of the constant-level supply tank.

Apart from the foregoing arrangements, a testing installation in accordance with the invention also has further properties which should preferably be considered in combination but which could be taken separately if necessary and relate especially to the following particular features:

the transfer openings formed through the partition-walls and side-walls of the vessel are fitted with rings forming centering guides for the cans to be tested, said guides being mounted if necessary in rolling cages in order to limit friction forces, mechanism for effecting displacement through the measuring vessel comprises at least two driving wheels each controlling the rotation of two rollers which are inclined to the axis of the can considered, the angle of inclination of said rollers being intended to determine the distance of forward travel of the can. The two driving wheels are located close to the two opposite side-walls of the vessel in which the can-transfer openings are formed. Each driving wheel is advantageously provided with a groove in which is mounted a tire for driving the rollers by frictional contact with said tire, the testing vessel is formed especially of transparent plastic material which permits visual observation of the cans during their displacement, a wetting product is added to the water in the vessel.

Further characteristic features of a testing installation in accordance with the invention will become apparent from the following description of one exemplified embodiment which is given by way of indication without any limitation being implied, reference being made to the accompanying drawings, wherein:

FIG. 1 is a view in perspective and in partial cross-section of the installation under consideration, FIGS. 2 to 5 are diagrammatic views of the same installation and serve more particularly to illustrate the mode of operation of this latter.

As can be seen from FIG. 1, the installation under consideration comprises mainly a parallelepipedal vessel 1, the assembled and bonded walls of which are formed especially of transparent plastic material so as to permit visual observation of operations which take place within the interior of said vessel. The vessel comprises a base 2, a cover-plate 2a and side-walls, only three of which are shown in FIG. 1 and which are designated respectively by the reference numerals 3, 4 and 5.

The side-walls 4 and 5 which are parallel to each other are also parallel to two internal partition-walls 6 and 7 which are mounted within the interior of the vessel in order to delimit between said partition-walls and said side-walls three adjacent compartments with a central compartment 8 and two lateral compartments 9 and 10. There are formed in the side-walls 4 and 5 as well as in the partition-walls 6 and 7 transfer openings such as those designated by the numerals 11, 12, 13 and 14 which are located opposite to each other and especially along a common horizontal line, said openings being of sufficient diameter to permit free transfer through the vessel of a cylindrical element to be tested and more particularly of an elongated tubular can of nuclear-reactor fuel pins. A guide ring 15 formed of suitable plastic material is advantageously mounted in each of the openings referred-to above in order that each can to be inspected such as the can which is designated by the reference numeral 16 in the drawings should be permitted to slide freely through the three compartments of the vessel 1, the space which is left free between the rings 15 and the can 16 being small but not leak-tight. If necessary, the guide rings 15 which also have the function of centering the can 16 can be mounted in rolling cages (not shown in the figure) so as to limit friction forces. The can 16 is provided in a manner which is conventional and known per se in the form of an elongated metallic tubular element having a cross-sectional diameter which is of very small value compared with the length. The can is further provided at each extremity with end-caps 17 of plastic material.

Testing of the can 16 which is illustrated and which is followed by a series of identical cans in automatic and continuous succession is carried out in a manner which is known per se by means of ultrasonic beams produced by emitter-receiver transducers, especially of the type comprising piezoelectric pellets of barium titanate. Said transducers are mounted on the side-walls of the vessel 1 and are focused on the axis of the can 16 which passes through said vessel whilst their angle of incidence is suitably adjusted. In the example described, provision is made for three transducers which are each intended to carry out a particular test on the can 16. The first transducer which is designated by the reference numeral 18 is designed to carry out a thickness measurement on the can; to this end, the transducer is focused to a point and centered on the axis of the can while being carried by the cover-plate 2a of the vessel. The focal distance of this transducer can be suitably adjusted by means of a threaded sleeve 19, the position of which is controlled by means of a micrometer screw 20 which forms a vernier. A second transducer 21 which is carried by that side-wall of the vessel which is located at the front of this latter in the drawings makes it possible to detect longitudinal flaws in the metal of the can 16. As in the previous case, said transducer 21 has a threaded sleeve 22 whose position is set by means of a vernier 23 in order to permit the possibility of adjusting the focal distance; the assembly which is thus formed is mounted in a guide 24 having a dovetail recess 25 so as to permit a vertical displacement of the transducer relatively to the can in respect of one setting of the angle of incidence of the emitted beam, said displacement being controlled by a micrometer screw which is not illustrated. Finally, a third transducer 26 which is provided in particular with the same elements as the transducer 21 is fixed on another guide 27 carried by the opposite face 3 of the vessel. Said transducer 26 which is designed to locate transverse flaws in the can is focused on the axis of the can in the same manner as the previous transducers and by means of a similar positional adjustment. A second adjustment of incidence is obtained by causing the sensitive face of the transducer to pivot about a pin 28 by means of an operating knob 29 which is provided on the body of the assembly, the movement of said operating knob being controlled by a micrometer screw which permits achievement of a very high degree of precision. Finally, as is apparent from FIG. 1, the three transducers 18, 21 and 26 are fixed on the opposite face 3 of the central compartment 8 of this latter which constitutes the measuring compartment proper as will be explained in greater detail hereinafter.

In order to ensure continuous displacement of the can 16 through the transfer openings 11 to 14 which are formed in the side-walls 4 and 5 of the vessel 1 and in the partition-walls 6 and 7, the installation comprises two driving wheels, only one of which is shown in the drawings in front of the side-wall 4 and designated by the reference numeral 30, the second driving wheel being mounted at the opposite end on the remote face of the side-wall 5. The wheel 30 is driven by means of a shaft 31 carried by a bearing unit 32 and determines as a result of friction the rotational motion of two rollers 33 and 34 which are inclined to the axis of the can 16 and in contact with the surface of this latter in order to subject the can to a continuous forward displacement in the axial direction with a general helical movement. The driving wheel 30 is provided with a groove having a radius equal to the radii of the rollers 33 and 34 in order to ensure correct tangential contact irrespective of the length of travel which is chosen. A support cradle 35 is carried by the bearing unit 32 in order to ensure suitable centering of the can in the axis of transfer between the rollers 33 and 34 prior to engagement in the guide rings 15.

In accordance with the invention, the installation comprises a unit for supplying water to the vessel 1 in which the can 16 and the extremities of the measuring transducers 18, 21 and 26 are continuously immersed, the water being intended to ensure suitable coupling and transmission of the ultrasonic energy supplied by said transducers towards the moving can and to permit the return of echos to said transducers for indicating the presence of flaws in said can. Said supply unit mainly comprises two tanks 36 and 37, the tank 36 being intended to constitute the supply tank proper while the second tank performs the function of a retention container in which water leakage from the vessel is collected. The supply tank 36 is connected to the bottom of the central compartment 8 of the vessel 1 by means of a first pipe 38 so that the water level within said compartment should always be identical with the level prevailing within the tank 36 while allowing for minor leakage, the water being supplied to the compartment via the pipe 38 in a laminar state of flow without any turbulence. The two compartments 9 and 10 which are adjacent to the central compartment are in turn connected through the respective bottom walls thereof by means of pipes 39 and 40 to the top portion of the retention tank 37. A pipe 41 connects the bottom portion of the retention tank 37 to the corresponding portion of the supply tank 36; said pipe 41 comprises a pump 42 which discharges continuously from the bottom tank to the top tank. Finally, a pipe 43 connects the top portion of the tank 36 to the top portion of the retention tank 37; said pipe 43 performs the function of an overflow which maintains the level within the supply tank 36 at a constant value. During the testing operation, the flow takes place in a laminar state from the central compartment to the lateral compartments by overflow at 6 and 7.

The operation of the testing installation according to the invention can accordingly be readily explained on the basis of the foregoing description and the diagrammatic FIGS. 2 to 5.

Figure 2:
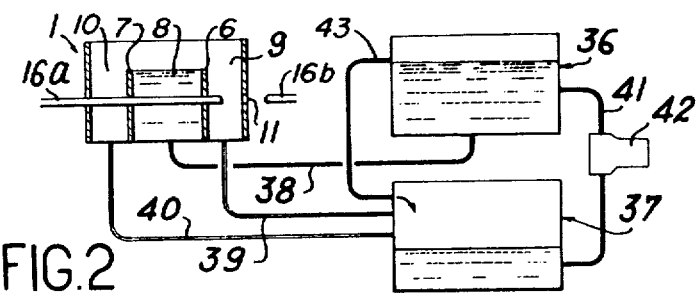

Thus, FIG. 2 shows a first can 16a in process of inspection by the transducers which are carried by the vessel 1 within the central compartment 8 whilst a second can 16b which is about to replace the first is still located outside the vessel. Displacement of the can 16a is carried out by means of the driving wheels 30 which are provided on each side of the vessel and the rollers 33 and 34, the length of each can being greater than that of the vessel so that at least one pair of rollers 33 and 34 is engaged with the can at each moment. In FIG. 2, the water level within the central compartment 8 is the same as the level within the supply tank 36 since said compartment and said tank communicate with each other through the pipe 38. Leakages between the can and the rings 15 within the transfer openings 12 and 13 are limited and in any case compensated by the corresponding flow which is supplied by said pipe. As the can 16a carries out within the compartment 8 a displacement during which the transducers effect the necessary measurements and tests, so the level within the compartment 8 is consequently maintained substantially at its value, the abovementioned leakages being continuously compensated from the supply tank 36.

Figure 3:
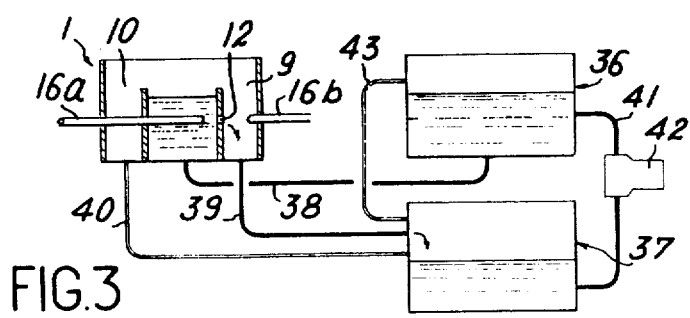
Figure 4:
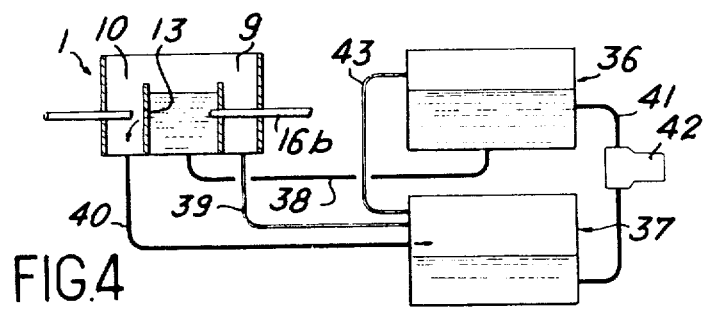
Figure 5:
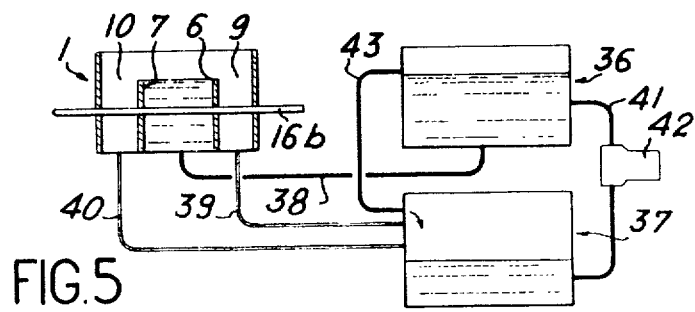

FIG. 3 illustrates the following position in which the right-hand extremity of the first can 16a is located within the central compartment 8 as a result of its continuous progression through the vessel, thereby freeing the penetration opening 12 in the partition-wall 6 and permitting the water contained in said compartment to flow into the lateral compartment 9. Said water is then returned to the retention tank through the pipe 39, then withdrawn from this tank via the pipe 41 and returned by means of the pump 42 to the supply tank 36 which is located above. In FIG. 4, the can 16a is completely withdrawn from the central compartment 8; thereby in turn freeing the opening 13 in the partition-wall 7; however, the left-hand extremity of the second can 16b has engaged at the same time in said central compartment 8 through the opening 12. Leakage then occurs towards the second lateral compartment 10 with return to the tank 37 via the pipe 40 and final return to the tank 36. Finally, in FIG. 5, the can 16b has come into position in place of the can 16a in FIG. 2, the level within the compartment 8 being in that case restored to its initial value.

Accordingly, the advantages of the installation under consideration are immediately apparent from the foregoing arrangements in which it is possible in particular to maintain a stable and laminar flow regime within the central compartment of the measuring vessel, thereby avoiding the presence of air bubbles and turbulences with the attendant disadvantages which have been recalled in the foregoing, in spite of the need to carry out continuous adjustment of the water level as a result of leakage between the moving cans and the can-transfer openings and more especially as a result of leakage occurring through said openings during the time interval which elapses between discharge of one can and admission of the following can. So far as the air bubbles are concerned, especially at the time of filling of the central vessel compartment for initial operation, it is an advantage to add a wetting agent to the feed water in order to cause the occluded bubbles to rise to the surface of the constant-level tank 36 from which said bubbles are discharged through the overflow pipe 43 to the retention tank 37. It should also be noted that, when the level is initially established within the central compartment, any bubbles which may be formed are immediately discharged as a result of the laminar flow which takes place towards the lateral compartments through the openings 12 and 13. So far as turbulences are concerned, it is apparent that only the top tank 36 is capable of receiving said turbulences from the pump 42 via the pipe 41; on the other hand, in the compartment in which the measurements are carried out, the flow of water both for supply and discharge always takes place in the laminar state without consequently producing any pressure wave on the transducers.

The vessel under consideration therefore offers the advantages of a sealed tank while in fact consisting of a continuous-leakage vessel without introducing any of the disadvantages attached to conventional devices of this type, that is to say by preventing turbulences and the presence of air bubbles which impair the accuracy of measurements. Moreover, since the volume of the central compartment is preferably chosen so as to be very small compared with the volume of the supply tank, the flow which takes place through the transfer openings during the time interval which elapses between discharge of one can and admission of the following can does not in any case result in substantial variation in level and this accordingly limits the risks involved.

The invention is clearly not limited in any sense to the exemplified embodiment which has more especially been described with reference to the drawings but extends to all alternative forms.

What we claim is:

1. An installation for ultrasonic testing of metallic elements and especially cans of nuclear fuel elements, wherein said installation comprises a parallelepipedal measuring vessel divided into three adjacent compartments by two partition-walls which are parallel to two side-walls of the vessel, said two partition-walls and said two side-walls being pierced by transfer openings located in oppositely-facing relation and having a diameter which is slightly larger than that of the elements to be tested, a mechanism for displacing the elements through the compartments of the vessel, ultrasonic transducers carried by separate faces of the vessel in the central compartment and a unit for supplying water to the vessel comprising a constant-level supply tank connected by a first pipe to the base of the central compartment and a retention tank connected by two separate pipes to the bases of the two other compartments, the two tanks being additionally connected to each other by means of two separate pipes of which one pipe constitutes an overflow for limiting the level to a constant value within the supply tank and the other pipe is fitted with a pump which continuously discharges from the retention tank to the supply tank.

2. A testing installation in accordance with claim 1, wherein the central compartment of the measuring tank has a small volume compared with the volume of the constant-level supply tank.

3. A testing installation in accordance with claim 1 and claim 2, wherein the transfer openings formed through the partition-walls and the side-walls of the vessel are fitted with rings forming centering guides for the elements to be tested.

4. A testing installation in accordance with claim 3, wherein the guides are mounted in rolling cages in order to limit friction forces.

5. A testing installation in accordance with claim 1, wherein the mechanism for effecting displacement through the measuring vessel comprises at least two driving wheels each controlling the rotation of two rollers which are inclined to the axis of element considered, the angle of inclination of said rollers being intended to determine the distance of forward travel of the element.

6. A testing installation in accordance with claim 5, wherein the two driving wheels are located on the two opposite sides of the vessel in which the element-transfer openings are formed.

7. A testing installation in accordance with claim 1, wherein the testing vessel is formed of transparent plastic material which permits visual observation of the elements during the displacement thereof.

8. A testing installation in accordance with claim 1, wherein a wetting product is added to the water in the vessel.

* * * * *